United States Patent [19]

Cripe

[11] 4,330,929

[45] May 25, 1982

[54] PROCESS FOR MAKING AN ELECTRICAL COMPONENT HAVING A METALLIC CASING WITH A CONFORMABLE PLASTIC COATING

[75] Inventor: Jerry D. Cripe, Mesa, Ariz.

[73] Assignee: Siemens Corporation, Iselin, N.J.

[21] Appl. No.: 100,947

[22] Filed: Dec. 6, 1979

[51] Int. Cl.³ .................. H01G 9/00; H01G 9/10
[52] U.S. Cl. ........................... 29/570; 29/588; 264/22; 264/69; 264/102; 264/126; 264/131; 264/255; 264/272.18; 361/433; 427/80; 427/81
[58] Field of Search ............... 29/570, 588; 361/433; 427/79, 80, 81; 264/262, 272.13, 272.14, 272.15, 272.18, 102, 22, 69, 126, 131, 255

[56] References Cited

U.S. PATENT DOCUMENTS

| | | | |
|---|---|---|---|
| 3,778,683 | 12/1973 | Buice et al. | 29/570 X |
| 4,155,156 | 4/1979 | Assmann et al. | 29/628 |
| 4,166,286 | 8/1979 | Boissonnault | 361/433 |
| 4,203,194 | 5/1980 | McGrath | 427/80 X |

FOREIGN PATENT DOCUMENTS 843485 8/1960 United Kingdom ........... 264/272.13

Primary Examiner—L. Dewayne Rutledge
Assistant Examiner—A. E. Schiavelli
Attorney, Agent, or Firm—Spellman, Joel & Pelton

[57] ABSTRACT

An electrical component which includes a circuit element such as a solid electrolytic capacitor arranged within a metallic casing or can. One electrical lead of the component is connected to the casing; the other lead is connected to the circuit element and extends through an opening in the casing. This opening is filled with a first plastic material to seal the circuit element within the casing against environmental conditions. A conformable coating of a second plastic material is disposed over the outer surface of the casing and extends over the edges of the casing into the opening so as to join with the first plastic material disposed in the opening.

23 Claims, 11 Drawing Figures

PROCESS FOR MAKING AN ELECTRICAL COMPONENT HAVING A METALLIC CASING WITH A CONFORMABLE PLASTIC COATING

BACKGROUND OF THE INVENTION

The invention relates to an electrical component which includes a circuit element, such as a solid electrolytic capacitor, arranged within a metallic casing or can. One electrical lead of the component is connected to the casing; the other lead is connected to the circuit element and extends through an opening in the casing. This opening is filled with a plastic material to seal the circuit element within the casing against environmental conditions.

Solid electrolytic capacitors consist of a sintered body constructed from a high purity metallic powder which is pressed around a corresponding metallic wire to form a cylindrical anode. Any one of a number of metals such as tantalum, niobium, aluminum or zirconium may be used, but tantalum is preferred. The anode is sintered at high temperatures in a vacuum into a porous body with a large metallic surface area. A metal oxide, such as tantalum pentoxide, is then formed on the internal and external surfaces by electrolysis to serve as the dielectric. Thereafter, a solid semiconductive oxide, such as manganese dioxide or lead oxide, is formed over the dielectric, for example in a pyrolysis oven conversion, to serve as the cathode. The structure is then dipped in graphite and silver to provide a conductive interface for the cathode connection.

The manufacture of this type of solid electrolytic capacitors may then proceed in the manner described in the U.S. Pat. No. 4,155,156. As is disclosed there, the anode wire connected to the cylindrical anode body is then flattened or notched and bent at the notch to make room for attachment of a solderable anode input wire. This input wire is then welded or soldered, in overlapping configuration, to the anode wire and the end of the anode wire is broken off.

These types of capacitors may be sealed in a number of ways. The simplest, most inexpensive procedure is to solder a second lead to the conductive coating of silver and to dip the entire device in hardenable low density plastic, such as epoxy resin. This type of seal is subject to environmental conditions, however, because the plastic is not impervious to moisture.

In a second, superior sealing process the capacitor is inserted in a solderable metal casing or can. The silver conductive coating is electrically and mechanically connected with the casing by embedding the capacitor in soft solder. A connecting wire is attached to the bottom of the casing to serve as the external cathode lead.

The anode wire with its attached input lead extends through an opening at the opposite end of the casing. This opening can be hermetically sealed by providing a metal-glass-metal cover. Both the metal anode wire and the metal casing are soldered to the respective metal portions of the cover, with the glass providing insulation between the anode wire and the casing.

In a third sealing process, the expensive metal-glass-metal cover is replaced by a hardenable plastic which fills the open end of the casing. Although this type of seal is less expensive, the plastic itself is pervious, particularly at the interface between metal and plastic: namely, along the anode wire lead and along the casing wall. Moisture may reach the inside of the casing via this interface, causing failure of the capacitor.

SUMMARY OF THE INVENTION

An object of the present invention is to provide an electrical component, in particular a solid electrolytic capacitor of the type described above, which is hermetically sealed against atmospheric conditions.

Another object of the present invention is to provide an electrical component having a hermetic seal which is less expensive to produce than corresponding seals heretofore known.

These objects, as well as further objects which will become apparent in the discussion that follows, are achieved, according to the present invention, by inserting a circuit element having a connecting lead into a metal casing, such that the casing surrounds the circuit element and the connecting lead extends through an opening in the casing. A first plastic material is then disposed in the opening in the casing surrounding the connecting lead and a second plastic material is disposed on the outer surface of the casing, and extends over the edges of the casing into the opening so as to join with the first plastic material disposed in the opening.

According to a preferred embodiment of the invention the first and the second plastic material are the same, and are preferably an epoxy resin.

According to another preferred embodiment of the invention the second plastic material is electrostatically coated over the surface of the metal casing to achieve high density.

The sealing arrangement according to the present invention is substantially impervious to environmental conditions such as humidity, and may therefore be termed a "hermetic" seal. This advantage has been achieved at substantially less cost than that of the metal-glass-metal cover which has previously been provided to seal the end of a metal casing or can.

It has been found, in particular, that the conformable plastic coating on the metal casing according to the present invention has a surprisingly beneficial sealing effect in the electrical component. This effectively hermetic seal is believed to be achieved because the coating of the second plastic material extends over the edges of the metal housing and joins with the first plastic material within the housing, preventing moisture from penetrating the component along the boundary between the first plastic material and the wall. Although the theoretical possibility exists that moisture may penetrate the component along the boundary between the anode input wire and the first and second plastic material, the surface area of the input wire is so small in comparison to that of the wall of the metal casing that only an insignificant quantity of moisture may enter along this path.

The conformable coating of the second plastic material has the additional advantage that it electrically insulates the metallic casing, thus preventing accidental grounding when the electrical component is installed in a circuit.

The process for manufacturing the electrical component according to the present invention includes the step of filling the metallic casing with a dry powder of the first plastic material after inserting of the circuit element. The casing is then subjected to vibration to cause the powder to pack together; the powder is melted and allowed to harden in a partial vacuum by applying a temperature of approximately 150° C. for approximately 10 minutes. Thereafter, a voltage is applied to the metal casing and a dry powder of the second plastic material is caused to electrostatically adhere. This second powder is then cured to form a coating by applying a temperature of approximately 150° for approximately 10 minutes.

The reduced pressure in which the first plastic material is cured is preferably about 10 inches of mercury below atmospheric pressure; this reduced pressure is allowed to increase at a rate of 1 inch of mercury per minute during the 10 minute period of cure.

Since the first plastic material, when cured, takes less space than when in powder form, the process of filling the casing by inserting the powder, vibrating the casing and heating the casing to cure the plastic material may be repeated several times until the casing is at least 75% filled.

Other features and details of the invention may be derived from the following disclosure of preferred embodiments with reference to the various figures of the drawings.

DESCRIPTION OF THE PREFERRED EMBODIMENTS

Figure 1:
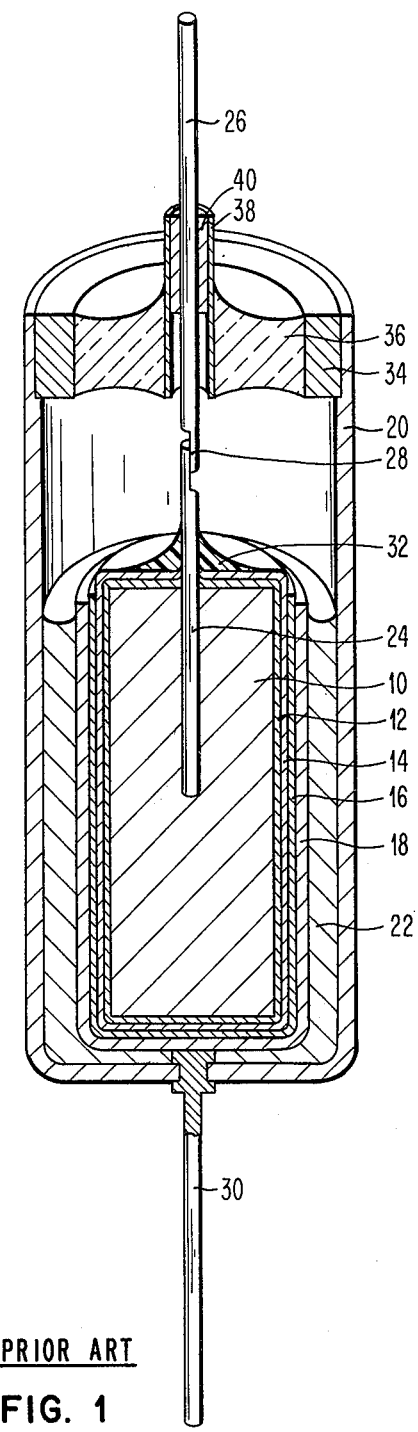
FIG. 1 is a cross-sectional diagram of a solid electrolytic capacitor with a first type of seal according to the prior art.

The preferred embodiments of the present invention will now be described with reference to FIGS. 1-6 of the drawings. Identical elements in the various figures are designated with the same reference numerals.

Figure 2:
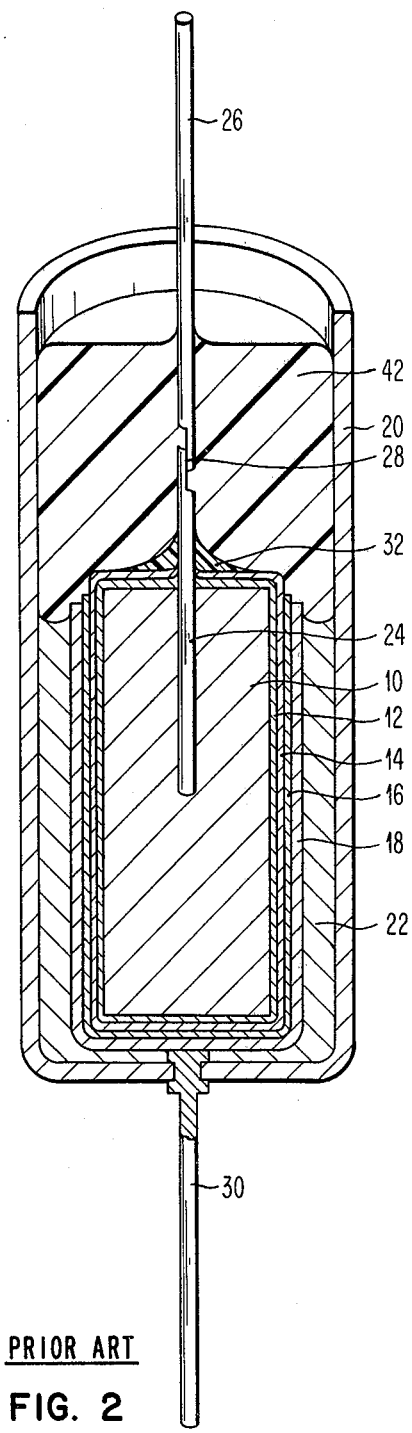
FIG. 2 is a cross-sectional diagram of a solid electrolytic capacitor with a second type of seal according to the prior art.

FIGS. 1 and 2 show solid electrolytic capacitors, respectively, which are sealed in a manner well known in the art. Each capacitor comprises a cylindrical structure 10 formed of tantalum powder particles, sintered together into a self-adhering mass. The surfaces of the individual tantalum powder particles are covered with a layer of tantalum pentoxide, which serves as a dielectric, and manganese dioxide, which serves as the cathode of the capacitor. These layers are illustrated in FIGS. 1 and 2 as the layers 12 and 14, respectively, surrounding the sintered tantalum structure 10; however, it will be understood that these layers are present throughout the tantalum structure, forming an extremely large capacitive surface within the structure. Superimposed on these two layers around the outside of the structure are layers of graphite 16 and silver 18 which provide a good electrical connection to the manganese dioxide. Finally, the electrical circuit element so formed is arranged in a casing or can 20, in electrical contact therewith via a bed of soft solder 22.

The electrical component is contacted at the anode (tantalum) side by a tantalum wire 24 embedded in the tantalum structure 10 and a nickel anode input lead 26 which is connected to the tantalum wire by a weld 28. The electrical component is connected at the cathode side by a nickel lead 30 which is soldered to the bottom of the casing 20. A ring 32 of epoxy supports the end of the tantalum wire 24 and prevents the solder 22 from coming into contact with this wire, thus shorting the component.

The open end in the metal casing 20 through which passes the anode input lead 26 is sealed, in the structures of FIGS. 1 and 2, in the following manner: In FIG. 1, there is provided a metal-glass-metal cap or cover which completely and hermetically seals the end of the casing. This cover comprises a metal ring 34, a glass ring 36 and a metal tube 38 surrounding the anode input wire 26. Moisture and other contaminents are prevented from penetrating the casing between the tube 38 and wire 26 by a ring 40 of solder. The external ring 34 is likewise soldered to the metal casing 20.

In the capacitor shown in FIG. 2, the complicated cover structure of FIG. 1 is replaced by a slug 42 of plastic material filling the end of the casing. This material may be one of a number of suitable plastics such as silicones, phenolic resins and epoxy resins. Epoxy resins are preferred.

While the sealing structure shown in FIG. 2 is simpler and less expensive to produce than that shown in FIG. 1, it is subject to moisture penetration. While the plastic material 42 is sufficiently thick to form a substantial moisture barrier, provided that it is properly packed and de-gased prior to and during curing, the interface between the plastic material 42 and the internal wall of the casing 20 provides a possible path for the intrusion of moisture. Similarly, the interface between the plastic material and the anode input wire 26 provides a path for the intrusion of moisture.

Figure 3:
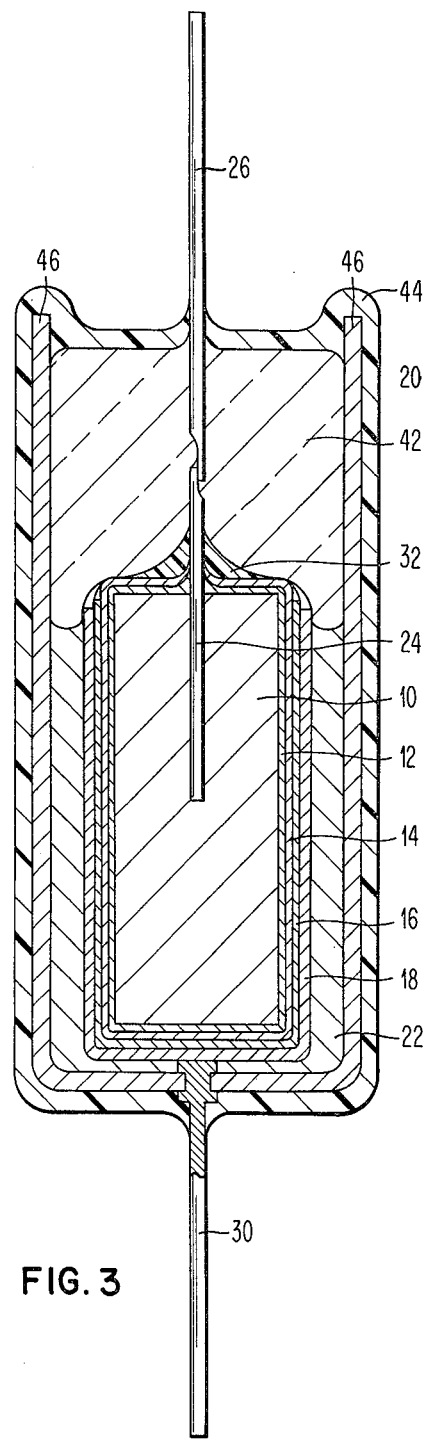
FIG. 3 is a cross-sectional diagram of a solid electrolytic capacitor having a seal according to the present invention.

FIG. 3 shows a capacitor of the type illustrated in FIGS. 1 and 2 which is sealed in accordance with the present invention. The various elements of the capacitor are the same as those shown in FIG. 2, but the capacitor includes the following improvement: the casing 20 is provided on its external surface with a coating 44 of a second plastic material. This coating extends over the upper edges 46 of the casing 20 and covers the slug 42 of plastic material filling the casing. By this measure, there is a connection between the plastic slug 42 and the plastic coating 44 so that the upper edges 46 of the metal casing 20 are covered. Thus, even when the interface or boundary between the plastic material 42 and the inner wall of the casing 20 is insufficient to form a seal, moisture is prevented from entering along this path.

It will be noted that the surface area of the anode wire 26 is exceedingly small compared to that of the wall of the casing 20. Thus, the chance of penetration of moisture along the wire 26 is negligibly small. In addition, the plastic coating 44 provides a double seal along the wire 26.

Figure 4C:
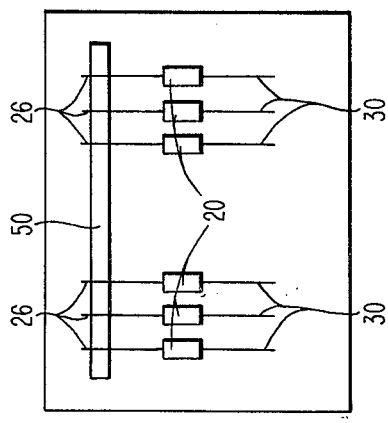
FIGS. 4A, 4B and 4C are schematic diagrams of successive stages of manufacture in which metal casings of electrical components are filled with a plastic material.
Figure 4B:
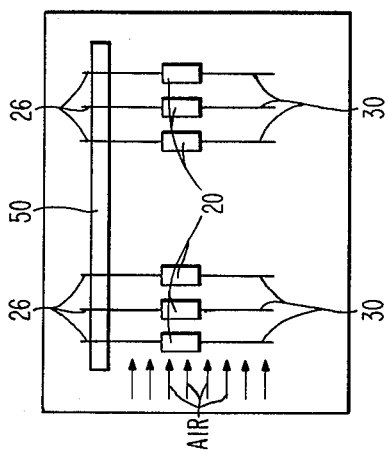
Figure 4A:
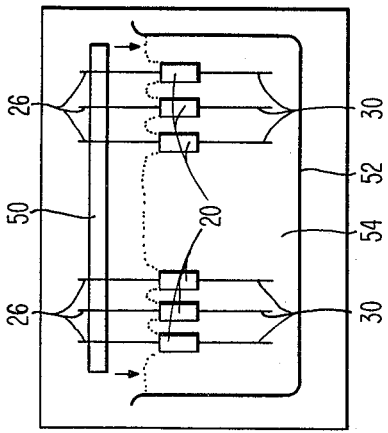

FIGS. 4A, 4B and 4C illustrates how the solid electrolytic capacitors are filled with plastic material after they have been inserted and soldered into a metal casing.

As shown in FIG. 4A, the anode input wires 26 are attached to a conveyor bar 50 and dipped into a container 52 which holds a fluidized bed of dry plastic powder 54. The plastic powder fills up the casings and is packed together within each casing by means of vibration. For example, the bar 50 may be subjected to vibration or the casings may be touched against the wall of the vibrating container 52.

A suitable fluidized bed container may be obtained from Systemations, a division of Koerper Corp., Milwaukee, Wis. Suitable plastic material is Hysol brand DK18-0623 red epoxy coating compound. This material is available from the Hysol Division of the Dexter Corporation, Olean, N.Y. While epoxy resin is preferred, other plastic materials such as silicones and phenolic resins may be used.

After filling the casings with dry plastic powder, the capacitors are removed from the fluidized bed and the powder is removed from the external surfaces. FIG. 4B shows air being directed under pressure to the casings and lead wires to clean their surfaces.

FIG. 4C illustrates how the plastic powder in the metal casings 20 may be cured (hardened). This is accomplished by inserting the casings in an oven, reducing the pressure by 10 inches of mercury (that is, 10 inches below atmospheric pressure) to de-gas the plastic, and raising the temperature to 150° C. for 10 minutes. During this process, the pressure may be increased at a rate of approximately 1 inch of mercury per minute so that atmospheric pressure is reached at the end of the 10 minute curing period.

The process described above is preferably repeated two or three times in order to sufficiently fill the metal casings 20. Preferably, the casings are at least 75% filled with plastic.

Figure 5C:
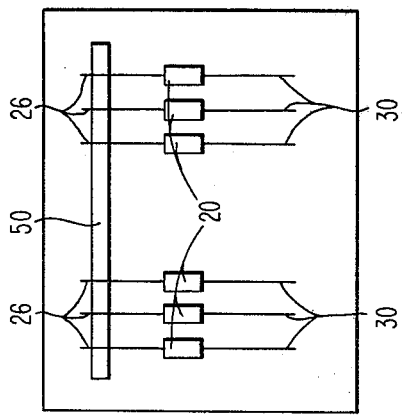
FIGS. 5A, 5B and 5C are schematic diagrams of successive stages of manufacture in which a conformable plastic coating is applied to metal casings of electrical components.
Figure 5B:
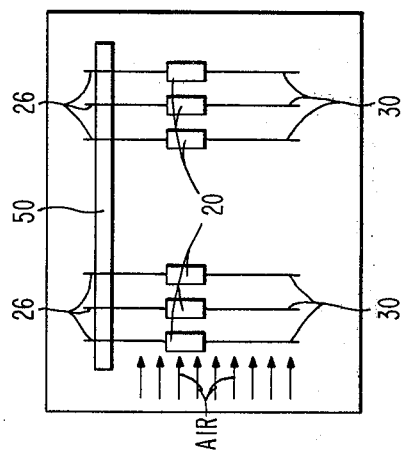
Figure 5A:
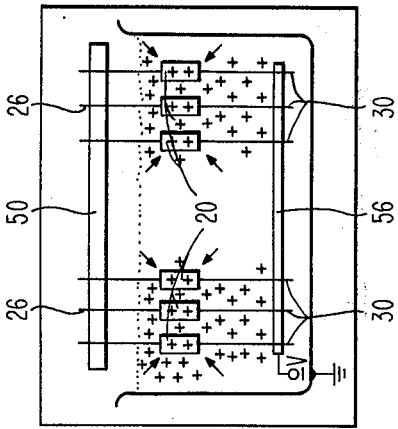

FIGS. 5A–5C illustrate the process of applying a conformable plastic coating to the casings according to the invention. FIG. 5A shows how the casings are placed in a fluidized bed with the leads attached to the bottom of the casings in contact with a bar 56 to which is applied a voltage (−V). The fluidized bed itself is grounded to prevent accidental shock to an operator. The negative potential on the casings tends to electrostatically attract the dry powder particles of plastic material in the fluidized bed. This plastic material is preferably also Hysol brand DK18-0623. The voltage applied to the bar 56 is preferably in the range of 10–30 kV. In general, the greater the voltage, the thicker the coating will be. A voltage of approximately 12 kV will yield a sufficient coating.

While the electrostatic coating is shown with the capacitors arranged vertically, it is preferable if they are horizontally arranged so that powder does not subsequently fall onto the electrical lead wires.

FIG. 5B shows how air may again be used to remove undesired plastic particles which adhere to the electrical leads. Compressed air is directed against the leads, as shown, but care must be taken to prevent the air from removing powder particles from the casings.

FIG. 5C illustrates how the plastic is cured to form the conformable coating on the casings. These casings are introduced into an oven and subjected to a temperature of 150° at normal atmospheric pressure for a period of approximately 10 minutes.

Figure 6A:
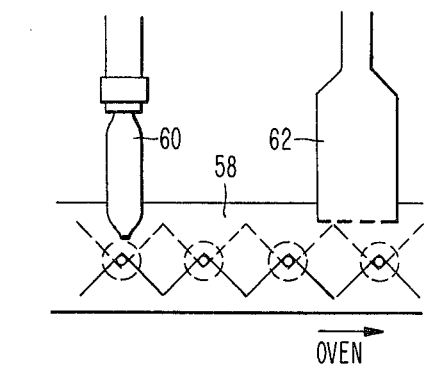
FIGS. 6A and 6B are side and top views, respectively, of a conveyor mechanism used in the manufacturing stage shown in FIG. 5B.
Figure 6B:
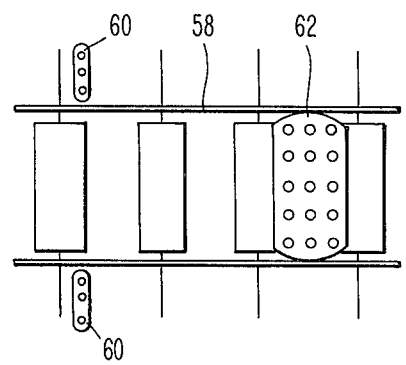

FIGS. 6A and 6B are side and top views, respectively, of a conveyor 58 for moving capacitors past air jets 60 to remove plastic particles from the electrical leads as in FIG. 5B. After removal of the particles from the wire leads, the casings are presintered at 300° C. for one to two seconds. This is accomplished by a quartz lamp heating device 62. This presintering causes the particles to soften slightly so as to adhere to the casing. As a result, the powder particles will not be jarred loose during subsequent handling. After passing through the stage shown in FIGS. 6A and 6B, the casings are passed to the oven for curing.

While the methods described herein of making electrical components, and the electrical components made according to these methods, constitute preferred embodiments of the invention, it will be understood that the invention is not limited to these embodiments and that a variety of changes may be made thereto without departing from the spirit and scope of the invention.

I claim:

1. A process for producing an electrical component comprising the steps of:
   (a) inserting a circuit element having a connecting lead in a metal casing with at least one opening, such that said casing surrounds said circuit element and said connecting lead extends through said opening;
   (b) disposing in said opening in said casing a first plastic material, such that said first plastic material surrounds said connecting lead;
   (c) hardening said first plastic material;
   (d) after completing step (c), coating the outer surface of said casing as well as said first plastic material in said opening with a second plastic material, such that said second plastic material surrounds said connecting lead as well as the edges of said casing at said opening.

2. The process defined in claim 1, wherein said circuit element is a capacitor with a solid electrolyte.

3. The process recited in claim 1, wherein said first and said second plastic material are the same.

4. The process recited in claim 3, wherein both said first and said second plastic material are an epoxy resin.

5. The improvement defined in claim 1, wherein said first plastic material is applied in powder form.

6. The process recited in claim 1, wherein said second plastic material is applied in powder form.

7. The process recited in claim 5, wherein said first plastic material is hardened at reduced pressure.

8. The process recited in claim 7, wherein said reduced pressure is approximately 6 inches of mercury below atmospheric.

9. The process recited in claim 7, wherein said first plastic material is hardened at an initially reduced pressure which is allowed to rise to atmospheric pressure at a prescribed rate.

10. The process recited in claim 9, wherein said initial pressure is approximately 10 inches of mercury below atmospheric and said prescribed rate is approximately one inch of mercury per minute.

11. The process recited in claim 1, wherein said step (b) includes:
   (1) immersing said casing into a fluid bed of dry powder of said first plastic material;
   (2) vibrating said casing to cause said powder to pack together in said casing; and
   (3) heating said casing to cure said plastic material.

12. The process recited in claim 11, wherein steps (1)–(3) are repeated until said opening in said casing is at least 75% filled.

13. The process recited in claim 11, further comprising the step of removing said first plastic material from said leads by means of a stream of air prior to heating.

14. The process recited in claim 11, wherein a partial vacuum is applied to said casing prior to heating to de-gas said plastic material during curing.

15. The process recited in claim 11, wherein said casing is heated to a temperature of approximately 150° C. for a prescribed period.

16. The process recited in claim 15, wherein said prescribed period is approximately 10 minutes.

17. The process recited in claim 1, wherein step (c) includes the steps of:
   (1) immersing said casing into a fluid bed of dry powder of said second plastic material;
   (2) applying a voltage between said casing and said fluid bed to cause said powder to electrostatically adhere to said casing;
   (3) heating said casing to cure said plastic material.

18. The process recited in claim 17, wherein said voltage is in the range of 10–30 kV.

19. The process recited in claim 18, wherein said voltage is approximately 12 kV.

20. The process recited in claim 17, further comprising the step of removing said second plastic material from said leads by means of a stream of air prior to heating.

21. The process recited in claim 17, wherein said casing is heated to a temperature of approximately 150° C. for a prescribed period.

22. The process recited in claim 21, wherein said prescribed period is approximately 10 minutes.

23. The process recited in claim 1, wherein said first plastic material is sufficiently thick, between said circuit element and said opening, that it forms a substantial moisture barrier for said circuit element.

* * * * *